Figure 1:
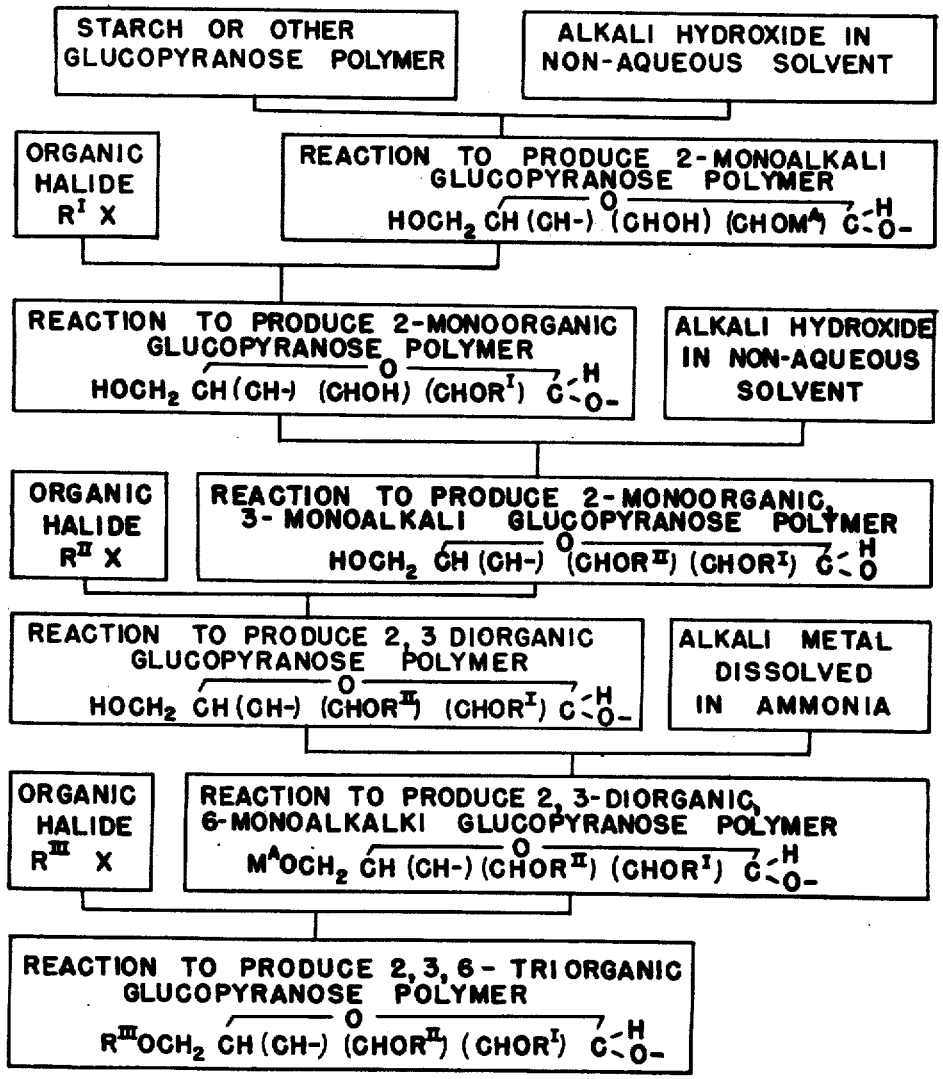

KENNETH M. GAVER
DERK V. TIESZEN
ESTHER P. LASURE
*INVENTORS*

KENNETH M. GAVER
DERK V. TIESZEN
ESTHER P. LASURE
INVENTORS

Patented Mar. 9, 1954

2,671,781

UNITED STATES PATENT OFFICE 2,671,781

PROCESSES FOR THE PREPARATION OF NEW CARBOHYDRATE COMPOUNDS

Kenneth M. Gaver, Columbus, Ohio, Derk V. Tieszen, Delmar, N. Y., and Esther P. Lasure, Grove City, Ohio, assignors to The Ohio State University Research Foundation, Columbus, Ohio, a corporation of Ohio Application June 26, 1951, Serial No. 234,642

8 Claims. (Cl. 260—233.3)

This application is in part a continuation of application Serial No. 694,328, filed August 31, 1946, now Patent 2,609,370, issued September 2, 1952.

The inventions disclosed in this application relate to new compositions of matter or compounds which we have prepared from glucopyranose polymer which have been heretofore unknown. The processes particularly described herein in illustration of our invention are especially designed to produce new products from starch.

In carrying out our process to produce preferred embodiments we produce as intermediate products certain new compounds which we have discovered and synthesized by our processes; these intermediate products when formed from starch being in the nature of alcoholates of starch. To designate these compounds, we have coined the word "starchate" which we define as follows: "Starchate" means and is used in this specification and in the claims hereof in the sense of a compound composed of an undetermined number of polymerized glucopyranose units wherein one or more metallic atoms or inorganic or organic radicals are substituted for the hydrogen atoms of one or more of the several hydroxyl groups of the starch unit so as to form a polymerized compound which in fact is (or is at least analogous to) an alcoholate of starch.

Prior to our inventions disclosed herein, a certain process had been discovered for the substitution of alkaline metals in the starch molecule to form a starchate which we will refer to hereinafter as the ammonia process and the ammonia process starchate. As demonstrated in a patent application copending with parent application Serial No. 694,328, Serial No. 707,318 now issued as Patent No. 2,518,135 issued August 8, 1950, and as demonstrated hereafter in this application, such prior art processes produce starchates which differ essentially from many of the starchates disclosed as intermediate products in this application. Also, in said Patent 2,518,135, there is disclosed the formation of a monosodium starchate and other monoalkali starchates and monometallic and monoorganic derivatives thereof, but as was demonstrated in said patent and as will be demonstrated hereafter herein such starchates also differ from the "ammonia process starchates" and from the polysubstituted starchates described herein.

Also, according to prior art methods, mono- and polysubstituted products of cellulose and of simple sugars had been prepared, as for example, as described in Scherer and Hussey, Journal of American Chemical Society, 53: 2344 (1931); Schorigin et al., Berichte 69: 1713 (1936); Peterson and Barry, U. S. Patent 2,157,083, 1939; unknown British Patent 463,056 (1937); Muskat, Journal of American Chemical Society, 56: 693 (1934); and Muskat, Journal of American Chemical Society, 56: 2449 (1934). As will be demonstrated hereafter in this application, these substituted products of cellulose and of sugars are different from the products produced by our improved process. Referring again to the prior art processes designated above as the "ammonia process," it may be noted that Schmid et al. (Chemical Abstracts 20: 744 (1926) and Chen. Cent. 2: 1761 (1928) produced a monoalkali derivative of starch by treating the starch with an alkali metal in liquid ammonia. Either as a final product or as an intermediate product these investigators obtained a monoalkali compound in which it was concluded that the reaction occurred on the six position carbon in the glucose unit of the starch molecule. Other investigators obtained sodium hydroxide absorption compounds by dissolving starch in aqueous alkali followed by alcohol precipitation. These compounds, however, were not starchates in that the alkali metal did not enter into the starch molecule.

Likewise, if glycogen, inulin, etc. are treated in liquid ammonia with an alkali metal, a monoalkali derivative is formed which is similar to the ammonia process starchates referred to in the last paragraph. This monoalkali derivative differs essentially from the monoalkali derivative formed in the process described in Patent 2,518,135 in that the alkali metal in such ammonia process starchates is attached to the No. 6 carbon atom whereas the monoalkali starchate described in such patent and described herein in connection with many of the processes of our present inventions is one in which the alkali metal is attached to the No. 2 carbon atom.

Heretofore, as stated above, it has been possible by known processes to form compounds in which metallic and nonmetallic elements, organic radicals, and/or other groups are substituted for one or more hydrogen atoms of one of the hydroxyl groups of a glucose or similar sugar. However, in the prior art processes dealing with starch it has not been possible heretofore to accurately predetermine on which of the hydroxyl groups these substituted groups might be placed nor has it been possible to form compounds in which selected predetermined groups are substituted on the various hydroxyl carbon atoms nor to form compounds which have one group substituted on one carbon atom, a second carbon atom and a third group on a third carbon atom. We can, by our new processes, form such compounds.

One of the objects of our invention is the provision of new and useful products formed from starch.

Further objects and features of our invention will be apparent from a reading of the subjoined specification and claims when considered in connection with the accompanying drawings, showing several exemplary processes illustrating certain embodiments of our inventions.

Figure 2:
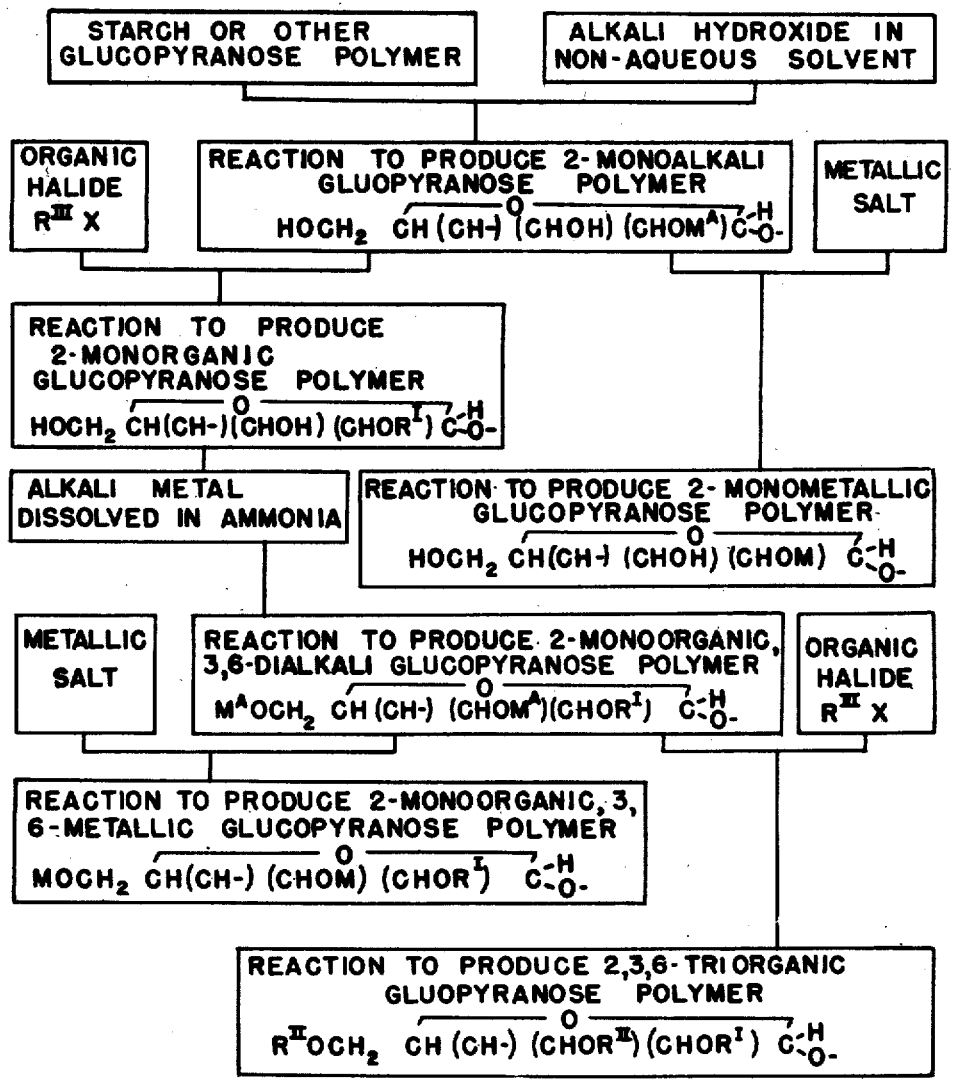
Figure 3:
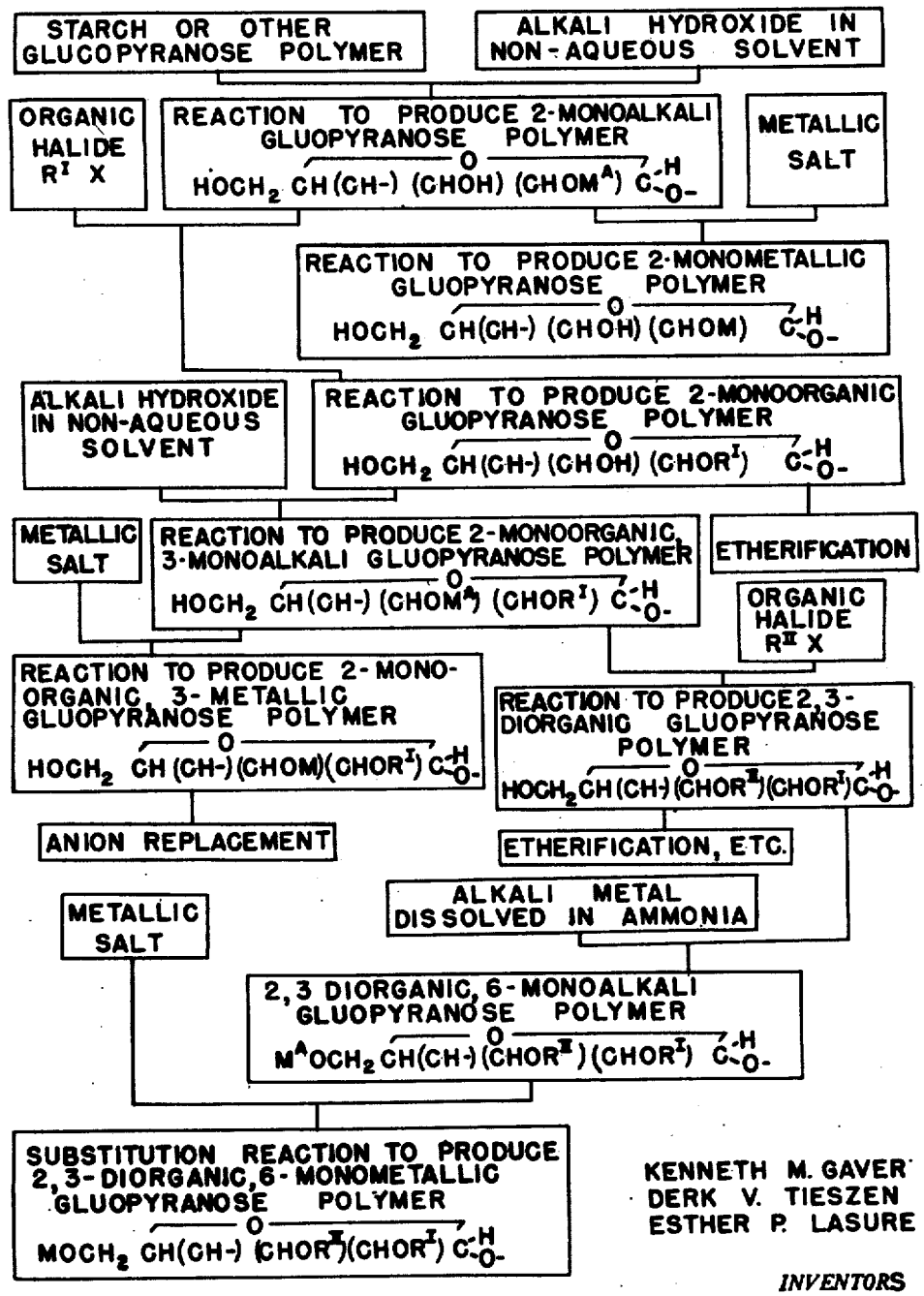

In the drawings:

Fig. 1 is a diagram illustrating a process of forming monalkali starchates, monoorganic starchates, polyorganic starchates and starchates having one or more organic radicals and also an alkali group substituted on the same glucopyranose unit, and of forming similarly substituted polyorganic glucoses, glucosides, glucose derivatives, and glucoside derivatives;

Fig. 2 is a similar diagram illustrating alternative processes to form the same and similar products and also illustrating alternative steps by which monoorganic glucoses and glucosides and their derivatives; and nonalkali monometallic starchates and mixed organic and metallic starchates and derivatives thereof may also be formed; and Fig. 3 is a similar diagram illustrating alternative processes for producing the same and similar products.

In Patent 2,518,135 there are disclosed inventions relating to monometallic starchates (both alkali and nonalkali) to monoorganic starchates, and to methods for their preparation. The claims of this application will be directed to the various mixed starchates produced by our improved processes. The invention disclosed in the aforesaid patent and its continuations are based upon the discovery that when starch is reacted with alcohol soluble hydroxides (such as the hydroxides of lithium, sodium, potassium, rubidium and caesium) under certain conditions there is produced a metallic starchate wherein the alkali metal is attached through an oxygen atom to a carbon atom in the complex-glucopyranose residue (the structure commonly considered as the building unit of starch).

The starchate product formed is a glucopyranose compound. The structural formula of the unit forming the building unit of the complex starchate may be illustrated as follows wherein M* represents an alkali metal:

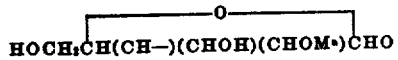

Investigation of the 2-monoalkali metal starchate (when tested by titration and chemical reactions) definitely proves that the starch derivative formed is not an addition or coordinated but is a true alcoholate of starch. This is further borne out in that the 2-monoalkali, metal starchates (particularly the sodium or potassium starchates) produced have been found to be adapted as disclosed herein for use as starting compounds in making other metallic derivatives, ethers, esters, and other typical compounds using nonaqueous reaction medium.

In preparing the 2-monoalkali starchates referred to above, we have investigated the effect of the following factors on the reaction.

Temperatures

Any temperature from 80° C. up to 115° C. in an open or closed system, which permits the volatilization of the water produced in the reaction produces 2-monosodium starchate. If the system is closed so that the water evolved in the reaction is retained in the reaction mixture, then the reaction will yield 2-monosodium starchate at any reasonable temperature above 80° C., i. e., up to the dextrinization temperature (unknown in nonaqueous solvents but perhaps to 200° C. or higher). Somewhere above 115° C., in an open system, other reactions occur and the product is no longer 2-monosodium starchate. Under strongly dehydrating conditions, e. g. with alcoholates, this reaction can be driven to completion at temperatures lower than 80° C.

Pressure

Apparently there is but very, very slight volume changes occurring in this reaction. Pressures up to 55 lbs. have been used with no effect on the course of the reaction or upon the product produced by the reaction. It is very probable that any practical pressure may be used provided the temperature and other requirements are not violated.

Time of reaction

The time of reaction varies with the solvent chosen. With ethyl alcohol any time beyond two hours does not alter the course of the reaction nor the character of the product. With butanol, the reaction is complete by the time the butanol (technical grade) reaches the boiling point of 115° C. A generalization may be made in that the reaction is completed within two hours at 80–81° C. or instantaneously at 115° C. or higher regardless of the nature of the solvent. Any temperature between 80° C. and 115° C. would require a proportionate reaction time (e. g. at 100° C. the time required is about 75 min. and at 110° C. the time required is about 15 min., etc.).

Alkali concentration

It has been repeatedly demonstrated that the reaction is independent of alkali concentration and the same product is always obtained provided there is sufficient alkali present to satisfy the requirements of the product. At the lower temperature range, i. e. 80° C., it is advisable to use an excess of alkali in order to complete the reaction in the two hour period. At the higher temperature range, i. e. 115° C. or higher only an amount of alkali approaching stoichiometric equivalent is necessary. The mother liquor from the latter reaction always shows a faint alkalinity approximating 0.04 N. This alkalinity apparently arises from the protein-alkali interaction product extracted from the starch. The protein is known to be extracted from the starch and appears in the mother liquor.

Nature of the alkali

Of the alkalies only ammonia failed to react. Sodium and potassium hydroxide, sodium methylate, sodium ethylate, sodium propylate and sodium butylate all yield chemically similar products. Any caustic alkali or alkaline reacting material having an ionization constant of $2 \times 10^{-5}$ or greater will react provided there is more than very slightly soluble in the chosen reaction media and also provided that the molecular size of the reacting molecule is not too large to locate itself in position to react with the starch.

Nature of the carbohydrate

Similar reaction products were prepared using waxy rice, yucca, sago, arrowroot, sweet potato, potato, corn, wheat, tapioca and amioca starches; a series of thin boiling starches; wheat, potato, tapioca and corn dextrins; dextran; cotton; linen; sucrose; α-methyl glucoside; jute; ramie; cellulose; and inulin.

Mechanism of the reaction

Water is evolved in the reaction and the amount of the water liberated is exactly chemically equivalent to the amount of alkali reacting with the starch to produce the 2-mono-alkali starchate. The proven overall reaction is

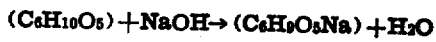

$$(C_6H_{10}O_5) + NaOH \rightarrow (C_6H_9O_5Na) + H_2O$$

The 2-alkali metal starchates made with alkali metal hydroxides as described above, undergo the Williamson ether reaction to form derivative products. The following typical products have been produced by us and are illustrative.

(a) Ethyl starchate.
(b) Benzyl starchate.
(c) Isoamyl starchate.
(d) Butyl starchate.
(e) Hydroxyl ethyl starchate.
(f) o-Chloro benzyl starchate.

Thus, an alkali metal atom can be substituted on the No. 2 carbon of the basic starch unit by reacting or treating, in approximately stoichiometric quantities, starch (or similar natural or synthetic carbohydrates) with an alkali or alkaline reacting material (having an ionization constant of $2 \times 10^{-5}$ or greater) in a solvent (containing enough of the alkali solution to produce 0.04 N or higher) at a temperature of 80° C. or higher (with or without agitation) for a period of two hours or longer. In such cases, a reaction will occur on the second carbon atom which will go practically to completion, provided alkali is present in sufficient quantity to permit one mole of alkali to react with one mole (162 grams) of starch. Under certain described exceptions, the temperature may be under 80° C. and under other described conditions the time may be under two hours.

Referring now to the diagrams of the drawings and especially to Fig. 1 for a detailed description of some of the processes illustrated, it may be seen that in the illustrated process, we react starch with an alkali hydroxide in a non-aqueous solvent as is fully described above. The alkali hydroxide may be sodium hydroxide, potassium hydroxide, rubidium hydroxide, caesium hydroxide or lithium hydroxide. Ammonia hydroxide is unsuitable. The nonaqueous solvent may be any solvent other than water which will dissolve sodium hydroxide to the extent of 0.04 N or higher. We have tested and found that the following solvents are all satisfactory and we have found no nonaqueous solvent which is unsatisfactory.

Solvents used

It has been found that any of the following alcohols may be used to prepare monosodium starchate provided that certain other variables are sufficiently controlled as will be discussed later. It must be understood that not all these mentioned have the same utility in the process. However, any solvent which will dissolve NaOH, even in small amounts, is a suitable vehicle in which to carry out the reaction provided that certain other variables are sufficiently controlled.

Alcohols which may be used

Allyl
Iso-amyl
n-amyl
Sec.-amyl
Tert.-amyl
Anisyl
Benzhydrol
Benzoylcarbinol
Benzyl
2,3-butanediol
n-Butyl
Iso-butyl
Sec.-butyl
Tert.-butyl
Sec. butyl carbinol
β (p-Tert. butyl phenoxy) ethyl
Capryl
Ceryl
Cetyl
3-chloro-2-propenol-1
Cinnamic
Crotyl
Cyclohexanol
Decyl
Diacetone
Diethyl carbinol
Dimethyl benzyl carbinol
Dimethyl ethynyl carbinol
Dimethyl n-propyl carbinol
Dimethyl isopropyl carbinol
Di-n-propyl carbinol
Di-iso-propyl carbinol
Ethyl
2-ethyl butyl
2-ethyl hexanol
Furfuryl
n-Heptyl
n-Hexyl
Sec.-hexyl
Lauryl
Methallyl
Methyl
Methyl amyl
Methyl butyl carbinol
o-Methyl cyclohexanol
m-Methyl cyclohexanol
p-Methyl cyclohexanol
2-methyl pentanol-1
Methyl isopropyl carbinol
n-Nonyl
n-Octyl
Octanol-2
Phenyl-propyl
n-Propyl
Iso-propyl
Tetrahydrofurfuryl
Triethyl carbinol
Triphenyl carbinol

Various polyhydric alcohols which may also be used

Ethylene glycol
Ethylene glycol monomethyl ether
Ethylene glycol monoethyl ether
Ethylene glycol monobenzyl ether
Ethylene glycol monobutyl ether
Diethylene glycol
Diethylene glycol monomethyl ether
Diethylene glycol monoethyl ether
Diethylene glycol monobenzyl ether
Diethylene glycol monobutyl ether Di-propylene glycol
Glycerol
Glycerol α-n-butyl ether
Glycerol α,α'-dimethyl ether
Glycerol α,γ-diphenyl ether
Glycerol α-monomethyl ether
Hexamethylene glycol
2-methyl-2,4-pentanediol
Propylene glycol
Triethylene glycol
Trimethylene glycol It is clear therefore that all nonaqueous solvents capable of dissolving the alkali to an extent comparable with the dissolving of sodium hydroxide to the extent of 0.04 N or higher are satisfactory. Step one of the process illustrated in Fig. 1 thus produces a 2-monoalkali starchate having a formula:

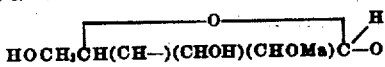

As a second step of the process disclosed in Fig. 1, we treat the 2-monoalkali starchate formed by step 1 above with an etherifying agent. We may suspend the starchate in from 1 to 10 times the calculated quantity of an etherifying agent and heat (with pressure, if desired (to 80–81° C. for from 2 to 24 hours. By this step we obtain a 2-monoorganic starchate having a formula:

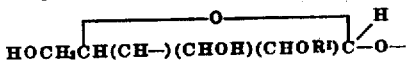

A dispersing solvent may be used if desired but is unnecessary. The reactants may be agitated or not, as desired. Pressure may be applied or not, as desired. The 2-monoalkali starchate may be treated in other manners with the organic compounds if desired. In the drawings, as examples we have designated these reactants as organic halides, but any organic compound containing a replaceable halogen or similarly reacting group is satisfactory. For instance, dimethyl sulfate, amyl nitrate, nitro paraffins, organic phosphates, acetates, benzoates, etc. are satisfactory. As further examples of the reactants which will react with the monoalkali metal or metallic starchate to produce the corresponding 2-monoethers of such carbohydrates, the following may be mentioned:

Acetodichlorohydrin
Allyl bromide
Allyl chloride
Allyl iodide
n-Amyl bromide
Iso-amyl bromide
Iso-amyl chloride
Tert.-amyl chloride
Amylene dichloride
Iso-amyl iodide
Benzalacetophenone dibromide
Benzal chloride
Benzotrichloride
Benzyl bromide
Benzyl chloride
Bromoacetic acid
ω-Bromoaceto-β-naphthone
α-Bromo-n-butyric acid
2-bromo-1-chloropropane
Bromocyclohexane
β-Bromoethyl ether
β-Bromoethyl phenyl ether
Bromoform
2-bromo-n-acetane
p-Bromophenacyl bromide
Bromopicrin
α-Bromopropionic acid
β-Bromopropionic acid
γ-Bromopropyl phenyl ether
α-n-Valeric acid
α-Bromo-iso-valeric acid
η-Butyl bromide
Iso-butyl bromide
Sec.-butyl bromide
Tert.-butyl bromide
n-Butyl chloride
Iso-butyl chloride
Sec.-butyl chloride
Tert.-butyl chloride
n-Butyl chloroacetate
Iso-butyl chlorocarbonate
α-Butylene bromide
β-Butylene bromide
Iso-butylene bromide
n-Butylidene chloride
n-Butyl iodide
Iso-butyl iodide
Sec. butyl iodide
Tert.-butyl iodide
Cetyl bromide
Cetyl iodide
Chloral
Chloroacetamide
Chloroacetodiethylamide
Chloroacetic acid
Chloroacetone
Chloroacetonitrile
Chlorobutane
β-Chlorobutyric acid
γ-Chlorobutyronitrile
Chlorocyclohexane
β-Chloroethyl acetate
β-Chloromethyl chlorocarbonate
Chloroform
Chloropicrin
α-Chloropropionic acid
β-Chloropropionic acid
β-Chloropropionitrile
γ-Chloropropyl chlorocarbonate
Decamethylene bromide
α,β-Dibromobutyric acid
2,3-dibromopropene
α,β-Dibromopropionic acid
β,γ-Dibromopropyl alcohol
3,5-dibromopyridine
α,β-Dibromosuccinic acid
Dichloroacetic acid
γ,γ'-Dichloropropyl ether
β,β'-Dichloroisopropyl ether
Epibromohydrin
Epichlorohydrin
Ethyl bromide
Ethyl bromoacetate
Ethyl γ-bromo-n-butyrate
Ethyl α-bromo-n-caproate
Ethyl bromomalonate
Ethyl α-bromopropionate
Ethyl β-bromopropionate
Ethyl α-bromo-isovalerate
Ethyl chloride
Ethyl chloroacetate
Ethyl α-chloroacetoacetate
Ethyl chlorocarbonate
Ethyl β-chloropropionate
Ethyl dibromoacetate
Ethyl dibromomalonate
Ethyl dichloroacetate
Ethylene bromohydrin
Ethylene bromide
Ethylene chloride
Ethylene chlorobromide Ethylene chlorohydrin
Ethylidene bromide
Ethylidene chloride
Ethyl iodide
Ethyl trichloroacetate
Glycerol α,γ-dibromohydrin
Glycerol α,γ-dichlorohydrin
Glycerol α,β-dichlorohydrin
Glycerol α-monochlorohydrin
n-Heptyl bromide
n-Heptyl iodide
Hexachloroethane
Hexamethylene bromide
n-Hexyl bromide
n-Hexyl chlorocarbonate
n-Hexyl iodide
Iodoacetic acid
Iodoform
Lauryl bromide
Lauryl chloride
Methyl bromide
Methyl bromoacetate
Methyl β-bromopropionate
Methyl chloroacetate
Methyl chlorocarbonate
Methyl chloroform
Methyl α,β-dibromopropionate
Methyl α,β-dichloropropionate
Methylene bromide
Methylene chloride
Methylene iodide
Myristyl bromide
Methyl iodide
n-Nonyl bromide
n-Octadecyl bromide
n-Octadecyl chloride
Phenacyl bromide
Phenacyl chloride
n-Propyl bromide Isopropyl bromide
n-Propyl chloride
Isopropyl chloride
Propylene bromide
Propylene bromohydrin
Propylene chloride
Propylene chlorobromide
Propylene chlorohydrin
s-Tetrabromoethane
s-Tetrachloroethane
Tetrachloroethylene
1,1,2-tribromoethane
Tribromoethylene
1,2,3-tribromo-2-methyl propane
1,2,3-tribromopropane
Trichloroacetic acid
Trichloro-tert.-butyl alcohol
2,2,3-trichlorobutyric acid
1,1,2-trichloroethane
Trichloroethylene
1,2,3-trichloropropane
Triglycol dichloride
Trimethylene bromide
Trimethylene bromohydrin
Trimethylene chloride
Trimethylene chlorobromide
Trimethylene chlorohydrin
Triphenylchloromethane
o-Xylyl bromide
m-Xylyl bromide
p-Xylyl bromide
o-Xylylene bromide
o-Xylylene chloride and similarly reacting chemicals including especially the esters.

The starchate may be dispersed with the organic compound in any suitable solvent. In addition to the solvents mentioned above, as solvents for the sodium hydroxide the following dispersing solvents may also be used:

Sec.-amyl benzene
Tert.-amyl benzene
Benzene
n-Butyl benzene
Sec.-butyl benzene
Tert.-butyl benzene
Cumene
Cyclohexane
2,7-dimethyl octane
Ethyl cyclohexane
Heptane
Hexane
Hexadecane
Ligroin
Methyl cyclohexane
Nonane
n-Octane
Iso-octane
n-Pentane
Petroleum ether
Propyl benzene
Tetraisobutylene
Tetradecane
Toluene
Tri-isobutylene
Trimethyl butane
Trimethylethylene
2,2,4-trimethyl pentane
Triphenyl methane
o-Xylene
m-Xylene
p-Xylene and various others.

The following ketones may also be used:
Acetone
Acetophenone
Anisolacetone
Benzalacetone
Benzophenone
Benzoylacetone
Diethyl
Diisopropyl
Ethyl phenyl
Ethyl undecyl
Methyl amyl
Methyl butyl
o-Methyl cyclohexanone
m-Methyl cyclohexanone
p-Methyl cyclohexanone
Methyl ethyl
Methyl hexyl
Methyl n-propyl
Methyl iso-propyl and various others.

The following ethers may also be used:
Allyl
Allyl ethyl
n-Amyl
Iso-amyl
Anethole
Anisole
Benzyl
Benzylmethyl
n-Butyl benzyl
n-Butyl
n-Butyl phenyl
1,4-dioxane
Di-n-propyl Benzyl ethyl
Chloromethyl
Dichloromethyl
Diethylene glycol diethyl
Ethyl butyl
Ethylene glycol dibenzyl
Ethylene glycol diethyl
Ethyl
Phenetole
n-Hexyl
n-Propyl
Iso-propyl and various others.

By these various lists we do not mean to exclude the any other dispersing solvents.

As step three of the process shown in Fig. 1, we react 2-monoorganic starchate resulting from step two with an alkali hydroxide in a nonaqueous solvent in the same manner as in step one with the difference that the temperature is raised to 115° C. or higher and provision is made for the removal of water. The same solvents as are used in step one are suitable: the same alkali hydroxides are suitable. The alkaline reacting material should have an ionization constant of $2\times10^{-5}$ or greater in a solvent containing enough of the alkali in solution to produce 0.04 N or higher at a temperature of 115° C. There may be agitation or not as desired. The reaction should continue for a period of one hour or longer. There must however be a provision for removal of water formed in the reaction. This is most important and the provision for the removal of water together with the higher temperature distinguish this step from the requirements of step one. It is essential as stated that the water evolved in the reaction be removed as rapidly as formed and therefore only those alcohols boiling at 115° C. or more have any utility as solvents in the reaction except in special cases where some other means have been devised to remove the water. At 115° C. the water is removed by boiling or distillation. At temperature below 115° C. special means must be provided for removing the water. This step of the process produces a 2-monoorganic, 3-monoalkali starchate, having a formula of

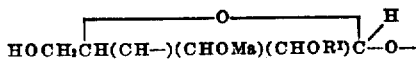

The fourth step of the illustrative process is similar to the second step. It comprises the reaction of the product of the third step with an organic reactant. This may be the same organic reactant as used in connection with the second step, or it may be a different organic reactant. It may be any one of the organic halides or similar reactants mentioned above in connection with step two. On treatment of the product, there is a reaction to produce a 2,3-diorganic starchate having a formula of

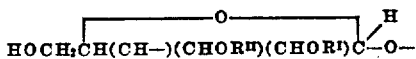

In this step, as in the preceding step, the temperature should be kept at 115° C. or higher and precautions should be taken to prevent water contamination.

The fifth step of the illustrative process comprises the reaction of the product of the fourth step with an alkali metal dissolved in ammonia. As pointed out above, this process which comprises the fifth step is a step known in the prior art. However, we combine it with the previous steps of this process and the combination becomes a new process because it involves a new combination of steps, some of which are old and some of which are new. Moreover, an entirely new product is obtained by this reaction. By it, we produce a 2,3-diorganic, 6-monoalkali starchate having a formula of

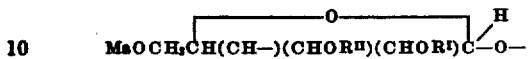

The sixth step of the illustrative process is similar to the second and fourth steps. In it we react the product of the fifth step with an organic reactant. This reactant may be the same as used in step four, or may be entirely different from the reactant used in those steps. By this sixth step reaction, we produce a 2,3,6-triorganic starchate having a formula of

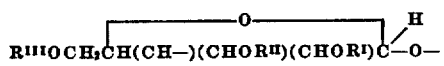

So far we have described only one particular type of the processes disclosed herein. We will describe other types. We pause here, however, to give some further idea of the number of new products which may be synthesized by our new processes. The following discussion in this paragraph refers only to the number of products which may be synthesized by processes following the type of the process described above as constituting steps one to eight of the process disclosed in Fig. 1. The number of reactants listed above as suitable for reaction in steps two, four and six include approximately eighty derivatives of chlorine. Thus we have at least eighty organic radicals (actually there are a great many more) which may be substituted either as $R^I$, $R^{II}$ or $R^{III}$. Inasmuch as any one of the radicals may be substituted for $R^I$, there are eighty different compounds which may be synthesized by the first two steps. Inasmuch as any of the radicals may in each case be substituted as $R^{II}$ there are $(80)^2$ or 6400 compounds which may be synthesized by the first four steps. Inasmuch as any of these radicals may be substituted as $R^{III}$, there are 512,000 or $(80)^3$ compounds which may be synthesized by the first six steps. Thus carrying the process through the sixth step enables us to produce approximately 500,000 new starchates.

The processes indicated in Fig. 2 parallel to some extent those described in connection with Fig. 1. However, the order of the steps of the processes disclosed in Fig. 2 are different from the order of the steps disclosed in Fig. 1, so that some new and different products are obtained. Also, several other branch processes are disclosed. Thus, while some of the products obtained by the processes disclosed in Fig. 2 are the same as the products obtained by the processes of Fig. 1, still there are disclosed new processes for producing the same new compounds as well as new processes for producing many other compounds not produced by the processes described in connection with Fig. 1. As in the process described in connection with Fig. 1, the first step of the processes illustrated in Fig. 2 is the reaction of starch with an alkali hydroxide dissolved in a nonaqueous solvent to produce a 2-monoalkali starchate. This is exactly the same step as in the process described in Fig. 1. Moreover, the second step is also exactly the same and comprises the reaction of the 2-monoalkali starchate with an organic reactant to produce a 2-monoorganic starchate. From this product the main process indicated in Fig. 2 follows the line drawn down the center of the figure and comprises the reaction of the 2-monoorganic starchate with an alkali metal dissolved in ammonia to produce a 2-monoorganic 3,6-dialkali starchate having a formula of

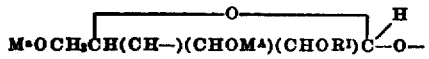

It will be noticed that this step three is similar to step five disclosed in Fig. 1. The result, however, is that the alkali metal is attached to both the No. 3 carbon atom and the No. 6 carbon with the result that the product of step three is entirely different from the product of either step three or step five of the previously described process. Step four is the reaction of this product with an organic reactant to produce a 2,3,6-triorganic starchate having a formula of

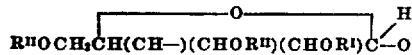

Although the designation of the organic radicals in the formula for this 2,3,6-triorganic starchate as shown in Fig. 2 differs from that of the 2,3,6-triorganic starchate produced by the first six steps of the process shown in Fig. 1 as is disclosed by a comparison of the formula, yet the product may be exactly the same, depending upon the choice of the organic reactant for reaction in steps two, four and six of the first process described, and for reaction in steps two and four of the processes described in connection with Fig. 2. Thus the products produced by this process may be produced by the process disclosed in Fig. 1, although the process differs because of the different order of the steps. Moreover, because in the process described in connection with Fig. 1, different organic groups may be placed on carbon 3 and carbon 6 a greater number of different organic starchates may be synthesized thereby than by the process in connection with Fig. 2.

We also disclose in connection with Fig. 2 processes for substituting nonalkali metallic groups in certain of the starchates. For example, we may react the 2-monoalkali starchate with a metallic salt to produce a 2-monometallic starchate, it being understood that in the formulas shown in the figures, while M* is used to indicate an alkali metal, M alone is used to indicate a non-alkali metal. Such a 2-monometallic starchate may be represented by the formula of

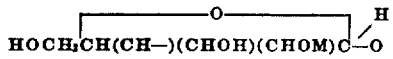

Again the 2-monoorganic, 3,6-dialkali starchate produced by the third step of the main process disclosed in Fig. 2 may be reacted with a metallic salt to produce a 2-monoorganic, 3,6-dimetallic starchate having a formula of

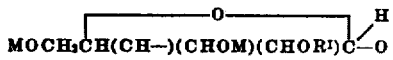

Many of these metallic starchates may be further reacted to replace the anion groups of multiple valent derivatives.

The processes disclosed in Fig. 3 are similar in many respects to those disclosed in the first portion of Fig. 1. That is to say, the first five steps or the main process shown in Fig. 3 are exactly the same as the first five steps of the process disclosed in Fig. 1. This starch is reacted with an alkali hydroxide in a nonaqueous solvent to produce a 2-monoalkali starchate. Thus 2-monoalkali starchate is converted by reaction with an organic compound to produce a 2-monoorganic starchate. This is reacted again with alkali hydroxide in a nonaqueous solvent at a higher temperature to produce a 2-monoorganic, 3-monoalkali starchate. This is reacted with an organic compound to produce a 2,3-diorganic starchate. This is reacted with an alkali metal dissolved in ammonia to produce a 2,3-diorganic, 6-monoalkali starchate having a formula of

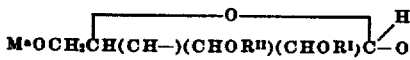

However, alternative processes disclosed in Fig. 3 are different from any of the processes previously disclosed in connection with Figs. 1 and 2. Thus, we show that the 2-monoalkali starchate may be reacted with a metal salt to produce a 2-monometallic starchate having a formula of

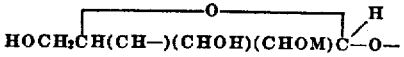

The 2-monoorganic, 3-monoalkali starchate may be reacted wit a metallic salt to produce a 2-monoorganic, 3-metallic starchate having a formula of

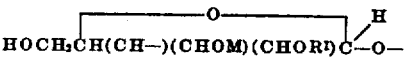

The 2,3-diorganic, 6-monoalkali starchate may be reacted with a metallic salt to produce a 2,3-diorganic, 6-metallic starchate having a formula of

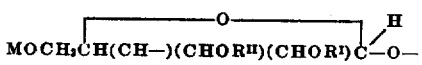

Any one of the above described monometallic starchates may then be reacted to effect replacement of anion groups of multiple valent derivatives.

Above in connection with Figs. 2 and 3 we have described the replacement of alkali metals with non-alkali metals by reaction of the alkali starchates with metal salts. In each of the cases specified we can, if we wish, use a non-metal inorganic salt as the reactant instead of a metal salt and obtain instead of the non-alkali metal starchates described in connection with said Figs. 2 and 3 corresponding non-metal inorganic starchates. Thus in fact we can react the alkali metal starchates with any salt, organic or inorganic, metal or non-metal and obtain corresponding organic or inorganic, metal or non-metal starchates.

We have described in this application methods of synthesizing the following types of starchates and starchate derivatives in connection with the figures indicated:

| Alkali starchates: | Figures of drawings |
|---|---|
| 2-monoalkali | 1, 2, 3 |
| Organic starchates: | |
| 2-monoorganic | 1, 2, 3 |
| 2,3-diorganic | 1, 3 |
| 2,3,6-triorganic | 1, 2 |
| Inorganic non-alkali metal and non-metal starchates: | |
| 2-monometallic | 2, 3 |
| Inorganic 2-mononon-metallic | 2, 3 |
| Mixed organic alkali starchates: | |
| 2-monoorganic, 3-monoalkali | 1, 3 |
| 2-monoorganic, 3 6-dialkali | 2 |
| 2,3-diorganic, 6-monoalkali | 1, 3 |

Figures of drawings

Mixed organic non-alkali metal starchates:
- 2-monoorganic, 3-monometallic ..... 3
- 2-monoorganic, 3,6-dimetallic ...... 2
- 2,3-diorganic, 6-monometallic ...... 3

Mixed organic inorganic non - metal starchates:
- 2-monoorganic, 3-mononon-metallic... 3
- 2-monoorganic, 3,6-dinon-metallic... 2
- 2,3-diorganic, 6-mononon-metallic... 3

As was demonstrated previously herein (assuming a list of only eighty organic radicals available for reaction i. e. substitution as $R^I$, $R^{II}$, $R^{III}$, $R^{IV}$, and $R^V$) it is clear that we have taught the synthesis of eighty 2-monoorganic starchates; sixty-four hundred 2,3-diorganic starchates; and five hundred twelve thousand 2,3,6-triorganic starchates.

From the above it will be clear that it is impossible to give examples of the synthesizing of all of the products possible by our improved process or even to give examples of all of the hundreds of products which we have actually synthesized.

Following are examples of the synthesis of various products by the use of processes of our invention.

Inasmuch as certain steps of the procedures involved in many of the examples were identical or substantially identical, we set out now a series of directions or procedures which are followed in performing such steps. These directions or procedures are designated as Procedures I–V, inclusive, and in each of the examples, we have merely stated that certain of these procedures were employed. Thereby we have not only reduced the work of writing out the examples but have also, we believe, presented the examples in a manner by which they may be more readily understood. Following are the five procedures referred to:

PROCEDURE I

*Preparation of 2-sodium starchate*

In a 1000 ml. three-necked flask fitted with an efficient agitator, a thermometer and a reflux condenser, place the following:

100 grams of starch.
22 grams of sodium hydroxide.
500 ml. butanol.

Heat this mixture to 85° C. for 2 hours with vigorous agitation. Filter on suction, wash with butanol and then with toluene. The product, at this stage can be used directly in Procedure IV. The product may, however, be dried to produce 2-sodium starchate. The 2-sodium starchate must be protected from moisture and carbon dioxide during filtration, processing and drying. Drying can be best effected in a vacuum at temperatures below 100° C. This procedure may be modified in certain ways, but the above is the procedure we recommend for use with the other procedures following.

PROCEDURE II

*Preparation of 2,3-disodium starchate (or 3-sodium starchate if C-2 is occupied by an organic radical)*

In a 1000 ml. Claissen flask fitted with an efficient agitator and a thermometer place the following:

100 grams of starch.
40 grams of sodium hydroxide.
750 ml. butanol.

Slowly distil with vigorous agitation until the distillation temperature ceases to rise (or when the temperature reaches 118° C.). Filter hot with elaborate precautions to avoid contamination by moisture and wash twice with anhydrous butanol then with anhydrous toluene.

The product at this stage can be used directly in Procedure IV. The dry product is unstable.

If C-2 is occupied by R then the amount of sodium hydroxide should be cut to 20 grams. This procedure may be modified relative to the alcohol. The mixture must boil in the range of 118° C. to 135° C. Other defined conditions are required.

PROCEDURE III

*Reaction of alkali on the Number 6 carbon of a 2,3-diorganic starchate*

In a 1000 ml. three-necked flask fitted with an efficient agitator, an ammonia inlet and a stopper, and immersed 2 inches in a Dry Ice-acetone bath, place the following:

Pass dry ammonia gas into the flask until 500 ml. of liquid ammonia have been condensed. Introduce 25 grams of diorganic starchate which soon disperses in the liquid ammonia under the influence of agitation. Add sodium wire piecewise until the mixture turns a permanent blue. The excess sodium, indicated by the blue color, may be destroyed by small amounts of carbon dioxide.

PROCEDURE IV

*Etherification according to the reaction*
$$RONa + RIX \rightarrow RORI + NaX$$

The sodium starchate prepared according to Procedures I or II is suspended in anhydrous toluene according to the following:

100 grams of starch (converted into the sodium starchate).
200 ml. toluene.
100 ml. of the organic halide.

This mixture is placed in a 1000 ml. bomb (preferably glass lined), sealed tight and autoclaved at 100° C. for about four hours.

The supernatant liquid is decanted (or filtered) off and the product repeatedly extracted hot with anhydrous butanol to remove the NaX formed. This purified product is then washed with anhydrous toluene and then dried.

PROCEDURE V

*Etherification according to the reaction*
$$ROH + RIX + NaOH \rightarrow ROR + NaX + H_2O$$

In a 1000 ml. three-necked flask fitted with an efficient agitator, a thermometer and a reflux condenser, place the following:

100 grams of starch (converted into the derivative).
750 ml. 20% sodium hydroxide.
100 ml. organic halide.

Heat this mixture at 95 to 105° C. for four hours with vigorous agitation. Neutralize the reaction mixture with HCl (1:1) and concentrate to a sirup under a vacuum. Take up the ether in alcohol and purify in the usual manner.

*Example I.—Synthesis of 2-ethyl, 3-n propyl, 6-n butyl starchate*

The following enumerated steps are used to prepare this starchate:

1. Procedure I applied to produce 2-sodium starchate.
2. Procedure IV applied with ethyl bromide to produce 2-ethyl starchate.
3. Procedure II applied to produce 2-ethyl, 3-sodium starchate.
4. Procedure IV applied with n-propyl bromide to produce 2-ethyl, 3-n propyl starchate.
5. Procedure III applied to produce 2-ethyl, 3-n propyl, 6-sodium starchate.
6. Procedure IV applied with n-butyl bromide to produce 2-ethyl, 3-n propyl, 6-n butyl starchate.

*Example II.—Synthesis of 2-n propyl, 3-isopropyl, 6-benzyl starchate*

The following enumerated steps are used to prepare this starchate:
1. Procedure I applied to produce 2-sodium starchate.
2. Procedure IV applied with n-propyl bromide to produce 2-n propyl starchate.
3. Procedure II applied to produce 2-n propyl, 3-sodium starchate.
4. Procedure IV applied with isopropyl bromide to produce 2-n propyl, 3-isopropyl starchate.
5. Procedure V applied with benzyl chloride to produce 2 - n propyl, 3 - isopropyl, 6 - benzyl starchate.

*Example III.—Synthesis of 2-n propyl, 3-methyl, 6-isobutyl starchate*

The following enumerated steps are used to prepare this starchate by a method consisting of a combination of steps differing from or differing in order from the steps of the method described in Example II:
1. Procedure I applied to produce 2-sodium starchate.
2. Procedure IV applied with n-propyl bromide to produce 2-n propyl bromide.
3. Procedure II applied to produce 2-n propyl, 3-sodium starchate.
4. Procedure IV applied with methyl iodide to produce 2-n propyl, 3-methyl starchate.
5. Procedure III applied to produce 2-n propyl, 3-methyl, 6-sodium starchate.
6. Procedure IV applied with isobutyl bromide to produce 2-n propyl, 3-methyl, 6-isobutyl starchate.

*Example IV.—Synthesis of 2-methyl, 3-ethyl starchate*

The following enumerated steps are used to prepare this starchate:
1. Procedure I applied to produce 2-sodium starchate.
2. Procedure IV applied with methyl iodide to produce 2-methyl starchate.
3. Procedure II applied to produce 2-methyl, 3-sodium starchate.
4. Procedure IV applied with ethyl bromide to produce 2-methyl, 3-ethyl starchate.

*Example V.—Synthesis of 2-ethyl, 3-methyl, 6-isopropyl starchate*

The following enumerated steps are used to prepare this starchate:
1. Procedure I applied to produce 2-sodium starchate.
2. Procedure IV applied with ethyl bromide to produce 2-ethyl starchate.
3. Procedure II applied to produce 2-ethyl, 3-sodium starchate.
4. Procedure IV applied with methyl iodide to produce 2-ethyl, 3-methyl starchate.
5. Procedure III applied to produce 2-ethyl, 3-methyl, 6-sodium starchate.
6. Procedure IV applied with isopropyl bromide to produce 2 - ethyl, 3 - methyl, 6 - isopropyl starchate.

*Example VI.—Synthesis of 2-methyl, 3-ethyl, 6-benzyl starchate*

The following enumerated steps are used to prepare this starchate:
1. Procedure I applied to produce 2-sodium starchate.
2. Procedure IV applied with methyl iodide to produce 2-methyl starchate.
3. Procedure II applied to produce 2-methyl, 3-sodium starchate.
4. Procedure IV applied with ethyl bromide to produce 2-methyl, 3-ethyl starchate.
5. Procedure V applied with benzyl chloride to produce 2-methyl, 3-ethyl, 6-benzyl starchate.

*Example VII.—Synthesis of 2-methyl, 3-ethyl, 6-benzyl starchate*

The following enumerated steps are used to prepare this starchate:
1. Procedure I applied to produce 2-sodium starchate.
2. Procedure IV applied with methyl iodide to produce 2-methyl starchate.
3. Procedure II applied to produce 2-methyl, 3-sodium starchate.
4. Procedure IV applied with ethyl bromide to produce 2-methyl, 3-ethyl starchate.
5. Procedure III applied to prepare 2-methyl, 3-ethyl, 6-sodium starchate.
6. Procedure IV applied with benzyl bromide to produce 2-methyl, 3-ethyl, 6-benzyl starchate.

*Example VIII.—Synthesis of 2-methyl, 3-ethyl, 6-butyl starchate*

The following enumerated steps are used to prepare this starchate:
1. Procedure I applied to produce 2-sodium starchate.
2. Procedure IV applied with methyl iodide to produce 2-methyl starchate.
3. Procedure II applied to produce 2-methyl, 3-sodium starchate.
4. Procedure IV applied with ethyl bromide to produce 2-methyl, 3-ethyl starchate.
5. Procedure V applied with n-butyl bromide to produce 2-methyl, 3-ethyl, 6-n-butyl starchate.

*Example IX.—Synthesis of 2-methyl, 3-ethyl, 6-butyl starchate*

The following enumerated steps are used to prepare this starchate:
1. Procedure I applied to produce 2-sodium starchate.
2. Procedure IV applied with methyl iodide to produce 2-methyl starchate.
3. Procedure II applied to produce 2-methyl, 3-sodium starchate.
4. Procedure IV applied with ethyl bromide to produce 2-methyl, 3-ethyl starchate.
5. Procedure III applied to produce 2-methyl, 3-ethyl, 6-sodium starchate.
6. Procedure IV applied with n-butyl bromide to produce 2-methyl, 3-ethyl, 6-n-butyl starchate.

Example X.—Synthesis of 2-methyl, 3-ethyl, 6-butyl starchate

The following enumerated steps are used to prepare this starchate:
1. Procedure I applied to produce 2-sodium starchate.
2. Procedure IV applied with methyl iodide to produce 2-methyl starchate.
3. Procedure II applied to produce 2-methyl, 3-sodium starchate.
4. Procedure IV applied with ethyl iodide to produce 2-methyl, 3-ethyl starchate.
5. Procedure III applied to produce 2-methyl, 3-ethyl, 6-sodium starchate.
6. Procedure IV applied with n-butyl bromide to produce 2-methyl, 3-ethyl, 6-n-butyl starchate.

Example XI.—Synthesis of 2-methyl, 3-ethyl, 6-isopropyl starchate

The following enumerated steps are used to prepare this glucose starchate:
1. Procedure I applied to produce 2-sodium starchate.
2. Procedure IV applied with methyl iodide to produce 2-methyl starchate.
3. Procedure II applied to produce 2-methyl, 3-sodium starchate.
4. Procedure IV applied with ethyl bromide to produce 2-methyl, 3-ethyl starchate.
5. Procedure V applied with isopropyl bromide to produce 2-methyl, 3-ethyl, 6-isopropyl starchate.

As pointed out above, the interlinked glucopyranose units which make up starch and other glucopyranose polymers have a structure of 1 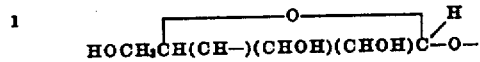

When an alkali metal atom is substituted on carbon 2 and the alkali metal is replaced by an alkyl radical, the structure becomes 2 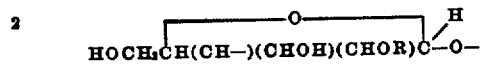

where R represents the alkyl. Then when the 3 and 6 carbons are replaced by an alkali metal atoms, the structure becomes 3 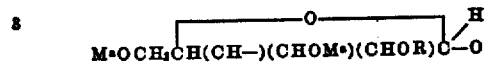

where $M^a$ is an alkali metal atom.

If the alkali metal atoms on the 3 and 6 are replaced by either non metal cations, cations of metal salts other than salts of alkali metals and salts of ammonium or ethereal salts having a radical differing from the radical represented by R, the structure becomes 4 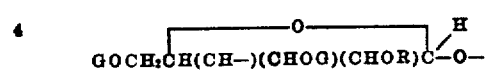

where G represents any one of the above mentioned non metal cations, cations of metal salts other than salts of alkali metal and salts of ammonium and ethereal salts having a radical differing from R.

If the polymer having an alkali metal atom on carbon 2 is mixed with alkali metal in liquid ammonia, further alkali metal becomes substituted on carbons 3 and 6 to form a polymer of which the unit structure becomes 5 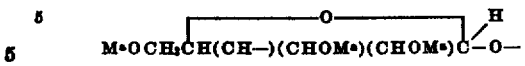

This polymer may be mixed with a metal salt to form a non-alkali metal trimetal polymer of which the unit structure becomes 6 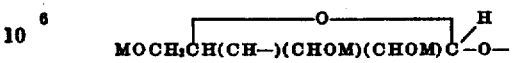

where M represents a metal atom other than an alkali metal atom.

The Formulas 3, 4, 5 and 6 may be generalized into

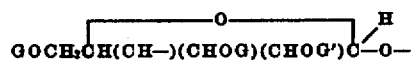

where G' represents either an alkali metal atom, a metal atom derived from a metal salt other than an alkali metal salt, or a cation derived from an ethereal salt and G represents either an alkali metal atom, a non-metal atom, a cation derived from an ethereal salt differing from the cation represented by G' or a cation derived from a metal salt other than an alkali metal salt provided that where G' is an alkali metal atom or other metal cation, G must represent an identical metal cation.

As stated above, inventions relating to monometallic starchates (both alkali and non-alkali); monoorganic starchates; polyalkali starchates; polymetallic starchates (non-alkali); and methods for the preparation of all such starchates have or will be fully disclosed and claimed in copending applications.

It is to be understood that the described embodiments of our invention are only illustrative and are not intended to limit the invention. Especially is it to be understood that while we have used "starch" and starchate throughout and have illustrated our invention by processes applied to starch, yet as is pointed out on column 5 above, the processes apply equally to other glucopyranose polymer. The scope of the invention is defined by the following claims.

We claim:
1. A method of making selectively, substantially uniformly substituted 2,3,6-trisubstituted glucopyranose polymer comprising reacting glucopyranose polymer with alkali metal hydroxide at a temperature in the range of approximately 78° C. to 98° C. in a nonaqueous alcoholic system in which the alcohol boils at a temperature above 78° C. at 760 mm. pressure with the alkali metal hydroxide present in at least stoichiometric quantities relative to the glucopyranose polymer to produce a 2-monoalkali metal glucopyranose polymer; and reacting the 2-monoalkali metal glucopyranose polymer so formed in a nonaqueous system with an ethereal salt dissociatable at a temperature of approximately 78° C. to 115° C. in a nonaqueous system to produce a 2-monoorganic glucopyranose polymer; reacting the 2-monoorganic glucopyranose polymer so formed by mixing it with a solution of an alkali metal dissolved in liquid ammonia with the alkali present in approximately double stoichiometric quantities to produce a 2-monoorganic-3,6-dialkali glucopyranose polymer; and reacting the monoorganic dialkali glucopyranose polymer so formed by mixing it in a nonaqueous system with salt dissociatable in a nonaqueous system and selected from the group consisting of ethereal salts, non- metal salts, and metal salts other than salts of alkali metals and of ammonia, to produce a 2,3,6-trisubstituted glucopyranose polymer in which the substituents on the 2-carbon of the glucopyranose units making up the glucopyranose polymer are substantially all identical with each other and are substantially uniformly cations selected from the group consisting of cations derived from ethereal salts and the substituents on the 3 and 6 carbons thereof are substantially all identical with each other and are substantially uniformly cations selected from the group consisting of cations derived from ethereal salts, nonmetal salts and metal salts other than salts of alkali metals and of ammonia.

2. A method of making selectively, substantially uniformly substituted 2,3,6-polysubstituted glucopyranose polymer comprising reacting glucopyranose polymer to replace one of the hydroxyl hydrogens thereof with an alkali metal atom by a reaction consisting of mixing glucopyranose polymer with alkali metal hydroxide at a temperature in the range of approximately 78° C. to 98° C. in a nonaqueous alcoholic system in which the alcohol boils at a temperature above 78° C. at 760 mm. pressure with the alkali metal hydroxide present in at least stoichiometric quantities in relation to the glucopyranose polymer to produce a 2-monoalkali metal glucopyranose polymer; and reacting the 2-monoalkali metal glucopyranose polymer so formed in a nonaqueous system with an ethereal salt dissociatable at a temperature of approximately 78° C. to 115° C. in a nonaqueous system to produce a 2-monoorganic glucopyranose polymer; reacting the 2-monoorganic glucopyranose polymer so produced with a solution of alkali metal dissolved in liquid ammonia with the alkali present in approximately double stoichiometric quantities to produce a 2-monoorganic-3,6-dialkali glucopyranose polymer in which the substituents on the 2-carbon of the glucopyranose units making up the glucopyranose polymer are substantially all identical with each other and are substantially uniformly cations derived from ethereal salts, and the substituents on the 3 and 6 carbons thereof are substantially identical with each other and are substantially uniformly alkali metal atoms.

3. A method of making selectively, substantially uniformly substituted 2-monoorganic-3,6-dimetallic glucopyranose polymer comprising reacting glucopyranose polymer with alkali metal hydroxide at a temperature in the range of approximately 78° C. to 98° C. in a nonaqueous alcoholic system in which the alcohol boils at a temperature above 78° C. at 760 mm. pressure with the alkali metal hydroxide present in at least stoichiometric quantities in relation to the glucopyranose polymer to produce a 2-monoalkali metal glucopyranose polymer; and reacting the 2-monoalkali metal glucopyranose polymer so formed in a nonaqueous system, with an ethereal salt dissociatable at a temperature of approximately 78° C. to 115° C. in a nonaqueous system to produce a 2-monoorganic glucopyranose polymer; reacting the 2-monoorganic glucopyranose polymer so produced by mixing it with a solution of an alkali metal dissolved in liquid ammonia with the alkali present in approximately stoichiometric quantities to produce a substantially uniformly substituted 2-monoorganic-3,6-dialkali glucopyranose polymer; and reacting the 2-monoorganic-3,6-dialkali glucopyranose polymer so formed by mixing it in a nonaqueous system with a metal salt which is dissociatable in a nonaqueous system and which is a metal salt other than salts of alkali metals and of ammonia, to produce a 2,3,6-trisubstituted glucopyranose polymer in which the substituents on the 2-carbon of the glucopyranose units making up the glucopyranose polymer are substantially all identical with each other and are substantially uniformly cations derived from ethereal salts and the substituents on the 3 and 6 carbons thereof are substantially all identical with each other and are substantially uniformly metal atoms of metals other than alkali metals.

4. A method of making selectively, substantially uniformly substituted 2-monoorganic-3,6-dialkali starchate comprising reacting starch with alkali metal hydroxide at a temperature in the range of approximately 78° C. to 98° C. in a nonaqueous alcoholic system in which the alcohol boils at a temperature above 78° C. at 760 mm. pressure with the alkali metal hydroxide present in at least stoichiometric quantities in relation to the starch to produce a 2-monoalkali metal starchate; reacting the 2-monoalkali metal starchate so formed in a nonaqueous system, with an ethereal salt dissociatable at a temperature of approximately 78° C. to 115° C. in a nonaqueous system to produce a 2-monoorganic starchate; reacting the 2-monoorganic starchate so produced by mixing it with a solution of an alkali metal dissolved in ammonia with the alkali present in approximately stoichiometric quantities to produce a 2-monoorganic-3,6-dialkli starchate in which the substituents on the 2-carbon of the glucopyranose units making up the starchate are substantially all identical with each other and are substantially uniformly cations derived from ethereal salts and the substituents on the 3 and 6 carbons thereof are substantially all identical with each other and are substantially uniformly alkali metal atoms.

5. A process of forming substantially uniformly substituted polysubstituted derivatives of glucopyranose polymer which comprises reacting glucopyranose polymer at a temperature of from 80° C. to 115° C. with alkali metal hydroxide in a substantially nonaqueous alcoholic system in which there is enough of the alkali to permit a mole of alkali to react with each glucopyranose polymer unit and to maintain an 0.04 N solution having an ionization constant of $2 \times 10^{-6}$ or greater to produce a 2-monoalkali metal glucopyranose polymer; reacting the monoalkali metal glucopyranose polymer at a temperature of from 80° C. to 115° C. with an alkyl ester whereby alkyl radicals replace the alkali metal cations to produce a monosubstituted alkyl glucopyranose polymer; reacting the substituted monoalkyl glucopyranose polymer so formed by mixing it with a solution of alkali metal in liquid ammonia in which there is sufficient alkali metal to permit two moles of alkali to react with each mole of the substituted glucopyranose polymer to form a 2-alkyl, 3,6-alkali glucopyranose polymer; and replacing the alkali metal substituents on the 3, 6 carbons by mixing the 2-monoalkyl,3,6-dialkali metal glucopyranose polymer in a nonaqueous system at a temperature of from 80° C. to 115° C. with ethereal salt dissociatable at a temperature of approximately 80° C. to 115° C. in a nonaqueous system whereby the ethereal salt cations replace the alkali metal cations to produce by a double decomposition a polysubstituted 2-alkyl,3,6-substituted glucopyranose polymer in which the substituents on the 2-carbon of the glucopyranose units making up the glucopyranose polymer are substantially all identical with each other and are uniformly cations derived from ethereal salts and the substituents on the 3 and 6 carbons thereof are substantially all identical with each other and are uniformly cations derived from ethereal salts.

6. A new composition of matter consisting of a glucopyranose polymer composed of uniformly substituted 2,3,6-trimetallic glucopyranose units.

7. The method described in claim 1 in which the glucopyranose polymer originally reacted is a starch and the product is a substituted starchate.

8. The method described in claim 3 in which the glucopyranose polymer originally reacted is a starch and the product is a substituted starchate.

KENNETH M. GAVER.
DERK V. TIESZEN.
ESTHER P. LASURE.

References Cited in the file of this patent

UNITED STATES PATENTS

| Number | Name | Date |
|---|---|---|
| 2,518,135 | Gaver | Aug. 8, 1950 |
| 2,572,923 | Gaver | Oct. 30, 1951 |

Certificate of Correction

Patent No. 2,671,781                                              March 9, 1954

Kenneth M. Gaver et al.

It is hereby certified that error appears in the printed specification of the above numbered patent requiring correction as follows:

Column 3, lines 64 and 65, after "coordinated" insert *compound*; column 7, line 21, for that portion of the formula reading $$6{-}o \quad \text{read} \quad 6{-}o{-}$$

column 14, line 26, for "wit" read *with*; column 19, line 51, for "atoms" read *atom*;

and that the said Letters Patent should be read as corrected above, so that the same may conform to the record of the case in the Patent Office.

Signed and sealed this 18th day of May, A. D. 1954.

[SEAL]

ARTHUR W. CROCKER,
*Assistant Commissioner of Patents.*